United States Patent
Killebrew et al.

(10) Patent No.: US 8,727,777 B1
(45) Date of Patent: May 20, 2014

(54) SYSTEM FOR CONCEPTUALIZING SPATIAL CONCEPTS

(76) Inventors: Jeffrey A. Killebrew, Alamogordo, NM (US); Scott A. Drake, Roswell, NM (US)

( * ) Notice: Subject to any disclaimer, the term of this patent is extended or adjusted under 35 U.S.C. 154(b) by 846 days.

(21) Appl. No.: 12/658,664

(22) Filed: Feb. 11, 2010

Related U.S. Application Data

(60) Provisional application No. 61/207,666, filed on Feb. 12, 2009.

(51) Int. Cl.
*G09B 21/00* (2006.01)

(52) U.S. Cl.
USPC .......................................... 434/112; 434/156

(58) Field of Classification Search
CPC .................................. G09B 1/00; G09B 21/00
USPC ......................................................... 434/112
See application file for complete search history.

(56) References Cited

U.S. PATENT DOCUMENTS

| | | | |
|---|---|---|---|
| 3,746,343 A | 7/1973 | Shapiro | |
| 4,674,982 A | 6/1987 | Mackey | |
| 5,507,649 A * | 4/1996 | Troudet | 434/233 |
| 5,769,639 A | 6/1998 | Foster | |
| 5,865,627 A | 2/1999 | Foresman | |
| 6,142,310 A * | 11/2000 | Haase et al. | 209/215 |
| 6,758,675 B2 | 7/2004 | Karabaic | |
| 7,106,220 B2 * | 9/2006 | Gourgey et al. | 341/27 |
| 7,238,027 B2 | 7/2007 | Kilvington et al. | |
| 7,273,375 B2 | 9/2007 | Wolf et al. | |
| 7,287,751 B2 | 10/2007 | Webber, Jr. | |
| 7,896,651 B2 * | 3/2011 | Saldutti | 434/156 |
| 8,523,572 B2 * | 9/2013 | Liebermann | 434/112 |
| 2004/0197745 A1 * | 10/2004 | Hong et al. | 434/113 |
| 2005/0084828 A1 * | 4/2005 | Goldberg et al. | 434/112 |
| 2008/0070201 A1 * | 3/2008 | Kwon et al. | 434/113 |
| 2009/0286211 A1 * | 11/2009 | Eisenhardt et al. | 434/113 |
| 2010/0020514 A1 * | 1/2010 | Lee et al. | 361/801 |
| 2011/0133407 A1 * | 6/2011 | Kim et al. | 273/293 |

* cited by examiner

*Primary Examiner* — Gene Kim
*Assistant Examiner* — Dolores Collins
(74) *Attorney, Agent, or Firm* — Dennis A. DeBoo

(57) ABSTRACT

A system for conceptualizing spatial concepts comprised of a plurality of elongated barriers having magnets imbedded therein for magnetically coupling the barriers to a planar member such as a magnetic white board and to one another for providing horizontally and vertically extending barriers for defining upper and lower partitioned work areas and left and right partitioned work areas such that a visual and/or tactile medium can be placed in each of the partitioned work areas and partially behind the horizontally extending barriers for locating one or more mediums above and below the horizontally extending barriers and to the left and right of the vertically extending barriers for conveying spatial concepts to students and for aiding students in the conceptualization of these spatial concepts and, in particular, wherein the students are blind, visually impaired, and/or kinesthetic learners.

14 Claims, 19 Drawing Sheets

SYSTEM FOR CONCEPTUALIZING SPATIAL CONCEPTS

CROSS-REFERENCE TO RELATED APPLICATIONS

This application claims priority under 35 USC Section 119(e) to U.S. Provisional Patent Application No. 61/207,666, filed Feb. 12, 2009, the entire disclosure of which is incorporated herein by reference.

FIELD OF THE INVENTION

This invention relates generally to teaching aids and, in particular, to a system for conceptualizing spatial concepts. More particularly, this invention relates to a means and methods for conveying spatial concepts to blind or visually impaired students and for aiding blind or visually impaired students in conceptualizing spatial concepts. Students who are kinesthetic learners also benefit from the use of this system.

BACKGROUND OF THE INVENTION

While working with students who are blind or have visual impairments, conveying spatial concepts can be difficult. These students cannot follow linear progressions without assistance. For example, understanding that place value columns must remain constant can be difficult to grasp without seeing it laid out with one number under the other. Hence, keeping track of multi-step problems as simple as multiplication or division up to and including differential equation is unrealistic if the student cannot follow the progression.

Accordingly, tracking movement or visualizing unseen concepts prove difficult to learn. Students with spatial difficulties may also exhibit tendencies where the learning area is difficult to move within.

One specific example of the difficulty in conveying spatial concepts is found when using the Nemeth Code for Braille mathematics wherein students write problems for fractions in the format of $\frac{1}{3} \times \frac{1}{5} =$. This arrangement is problematic in that it fails to convey the spatial concept for teachers to give directions such as "now, multiply straight across, both top and bottom."

In all areas of education, conveying spatial concepts to blind or visually impaired students can be difficult. And yet, many fundamental principles are built on conceptualizing basic spatial concepts. For example, dimensional analysis is a fundamental spatial concept which must be conceptualized in the art of math and science.

In view of the foregoing, there is a need for a system that overcomes the significant shortcomings of as exemplified hereinabove.

BRIEF SUMMARY OF THE INVENTION

It is noted at the outset, the present invention "The System for Conceptualizing Spatial Concepts," also known as $(SC)^2$ has been recognized as a new and unique new teaching method for blind and visually impaired students to introduce spatial concepts such as linear math problems. This recognition includes the distinction of being awarded the 2009 Louis Braille Touch of Genius Prize for Innovation by the National Braille Press. The Touch of Genius Prize was established to recognize an individual or group of individuals who contribute to innovation in the field of tactile literacy for blind people. In their award letter, the prize's adjudication committee stated that they chose it from over twenty applications from five countries because they "loved the simple yet elegant nature of the design" and "the flexibility it has for teaching a variety of concepts to blind and visually impaired students."

Further praise from the National Braille Press relates that "$(SC)^2$ is an instructional tool for individuals who are blind that provides equal access and participation in science, math and related coursework. By utilizing a system of beveled and magnetized blocks affixed to a magnetic white board, $(SC)^2$ allows blind individuals to spatially arrange, manipulate, and calculate complex mathematical and scientific formulae by simply inserting 3×5 cards that students have brailled with values and labels of each term in a Janus slate. It allows blind individuals equal access and participation in the classroom while encouraging higher order thinking and greater scientific and mathematical literacy for blind students."

Accordingly, and in one aspect, an embodiment of the present invention provides a system for conceptualizing spatial concepts comprised of magnetized visual or tactual barriers to define a work area for different educational concepts including math and science concepts. In one particular embodiment, this system is employed for conveying spatial concepts to blind or visually impaired students and for aiding blind or visually impaired students in the conceptualization of these spatial concepts. Students who are kinesthetic learners also benefit from the use of this system.

In general, and in one aspect, an embodiment of the invention provides a system for conceptualizing spatial concepts comprised of a plurality of elongated barriers or tactile feedback members having magnets imbedded therein for magnetically coupling the barriers to a magnetic member or working surface such as a planar magnetic white board and to one another for providing horizontally and vertically extending visual and/or tactile feedback barriers or elements for defining upper and lower partitioned work areas and left and right partitioned work areas such that a visual and/or tactile medium such as a brailled index card can be placed in each of the partitioned work areas by sliding a substantially planar edge of each medium between one of a pair of opposed beveled friction surfaces of the horizontally extending barriers and the planar magnetic white board for locating and securing one or more mediums above and below the horizontally extending barriers and to the left and right of the vertically extending barriers for conveying spatial concepts to students and for aiding students in the conceptualization of these spatial concepts.

Accordingly, and for example, a visual and/or tactile medium such as an index card with a visual and/or brailed number thereon can be employed for conveying the spatial concept of the fraction problem delineated in the background of the invention such that the system for conceptualizing spatial concepts now allows students to conceptualize this problem as $\frac{1}{3} \times \frac{1}{5} =$, which make more spatial sense, and which now allows teachers to give directions such as "multiply straight across, both top and bottom."

More particularly, and in one aspect, an embodiment of the invention provides a system for conceptualizing spatial concepts comprised of a three different sized barriers in the form of three different sized rectangular bars comprised of two horizontal bars and a vertical bar. The two horizontal bars both have magnets imbedded in the back to hold them and mediums such as pictures/labels firmly on a magnetic white board. The two horizontal bars also have smaller magnets in their ends so as to connect to magnets in the side of the vertical bar or to connect to each other. Additionally, and in one embodiment, the upper and lower back longitudinally extending edges of the two horizontal bars are beveled to provide a beveled friction surfaces to allow for mediums such as pictures, note or index cards, and/or symbols to be easily received behind each bar and engage frictionally between the beveled friction surfaces and the magnetic working surface such as the magnetic white board.

Students who are visually impaired, as well as others, benefit from the use of this system providing large visual or tactual barriers or elements to define the work area of, for example, different math and science concepts. The system enables vertical and horizontal alignments to be easily demonstrated and distinguished as the student will either feel a larger barrier or can easily see the separation. Some of the same students also have difficulties with organization of thoughts, ideas, or multi-step equations. This system enables them to fully use linear algorithms.

Hence, and in one aspect, an embodiment of the present invention provides a system for conceptualizing spatial concepts that enables students to follow linear models.

In another aspect, an embodiment of the present invention provides a system for conceptualizing spatial concepts that provides students with a tactual or relief view of classroom concepts.

In another aspect, an embodiment of the present invention provides a system for conceptualizing spatial concepts that allows for kinesthetic learners to move and manipulate a problem, furthering their understanding.

In another aspect, an embodiment of the present invention provides a system for conceptualizing spatial concepts that allows students to create the same problems they encounter in their texts.

In another aspect, an embodiment of the present invention provides a system for conceptualizing spatial concepts that is not limited to preconceived or created problems.

In another aspect, an embodiment of the present invention provides a system for conceptualizing spatial concepts that can follow a specific curriculum, or be adapted to real world situations wherein students create problems.

In another aspect, an embodiment of the present invention provides a system for conceptualizing spatial concepts for use with volatile data, or student created data.

In another aspect, an embodiment of the present invention provides a system for conceptualizing spatial concepts that allows students who are blind or have visual impairments with an opportunity to compete in real time with sighted peers on same problems.

In another aspect, an embodiment of the present invention provides a system for conceptualizing spatial concepts that is adaptable to any class or curriculum.

Accordingly, having thus summarized aspects of the present invention, it should be apparent that numerous modifications and adaptations may be resorted to without departing from the scope and fair meaning of the present invention as set forth hereinbelow by the claims.

DETAILED DESCRIPTION OF THE INVENTION

Figure 1:
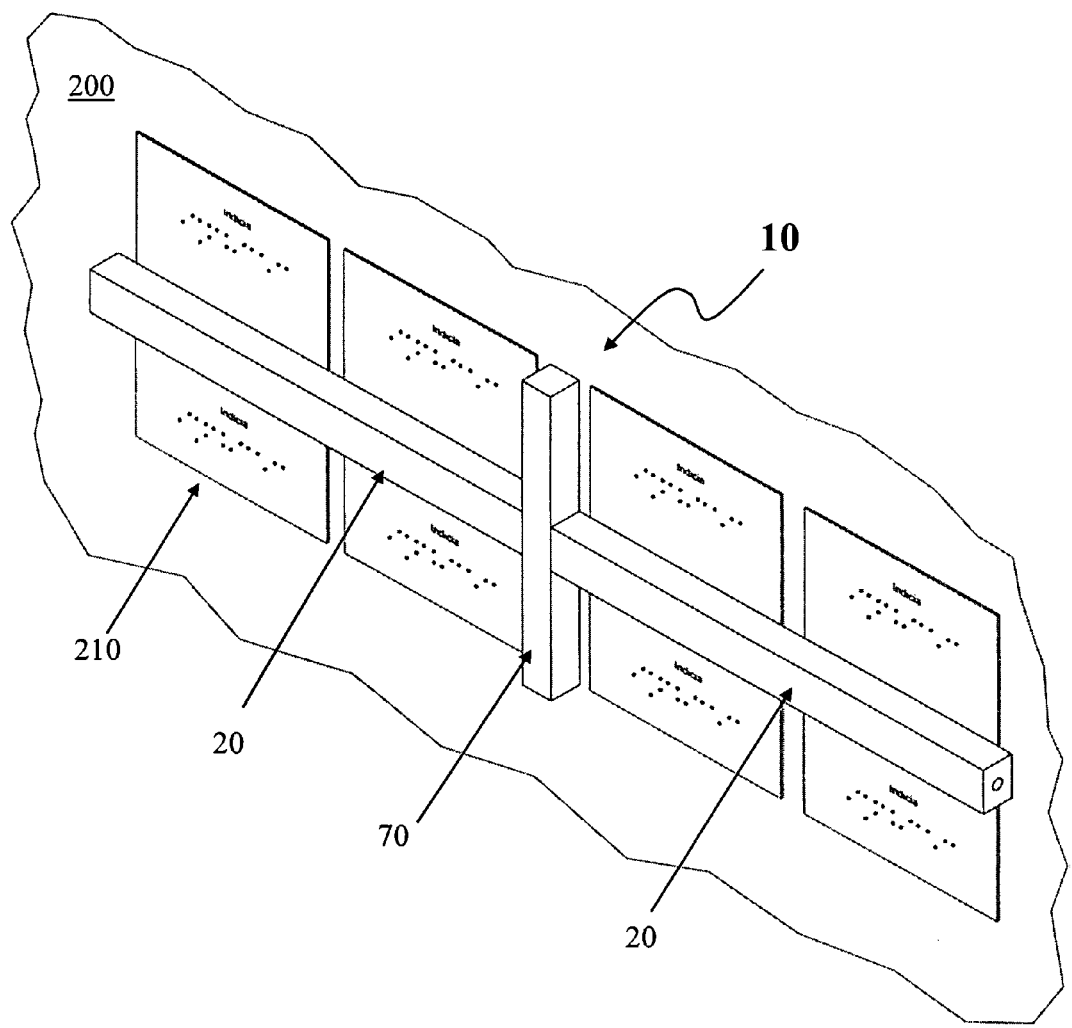
FIG. 1 is a front perspective view of an embodiment of a system for conceptualizing spatial concepts, a front perspective view of visual and/or tactile medium, and further illustrating a fragmentary view of a magnetic working surface which, in one embodiment, is a magnetic white board.

Considering the drawings, wherein like reference numerals denote like parts throughout the various drawing figures, reference numeral 10 is directed to an embodiment of a system for conceptualizing spatial concepts.

Figure 2:
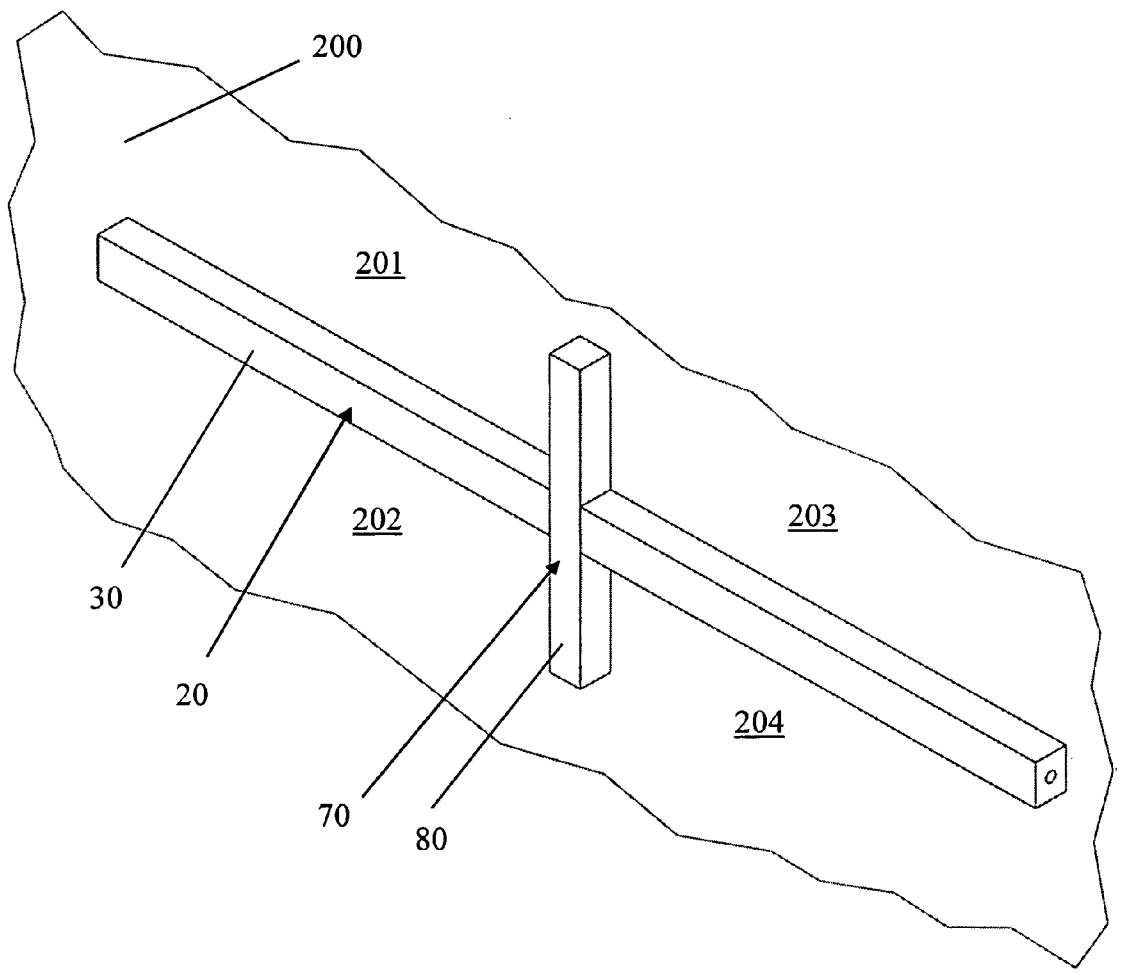
FIG. 2 is a front perspective view of an embodiment of the system for conceptualizing spatial concepts and further illustrating a fragmentary view of the magnetic white board.

Referring to FIGS. 1 and 2, and in one embodiment, the system 10 is comprised of a plurality of horizontally extending barriers or tactile feedback members 20 magnetically coupled to a magnetic working surface such as a planar magnetic white board 200 and at least one vertically extending barrier or tactile feedback member 70 also magnetically coupled to the planar magnetic white board 200 and interposed between two consecutive horizontally extending barriers or tactile feedback members 20 for defining upper and lower partitioned work areas 201, 202 and 203, 204 and left and right partitioned work areas 201, 203 and 202, 204 such that a visual and/or tactile medium 210 such as brailled index cards can be placed in each of the partitioned work areas by frictionally engaging a substantially planar edge of each medium 210 between the horizontally extending barriers 20 and the planar magnetic white board 200 for locating and frictionally securing one or more mediums 210 above and below the horizontally extending barriers 20 and to the left and right of the vertically extending barrier 70 for conveying spatial concepts to students and for aiding students in the conceptualization of these spatial concepts.

Horizontally Extending Barrier 20

More specifically, and referring to FIGS. 2 through 7, each horizontally extending barrier 20 is comprised of an elongated body 22 having a longitudinal axis 24 and, one embodiment, having a shape of an irregular hexagonal prism generally having an irregular hexagonal transverse cross-section. The irregular hexagonal prism shaped body 22 is comprised of a pair of spaced apart rectangularly shaped first and second end faces 26 and 28, a rectangularly shaped front face 30 longitudinally extending between the first and second end faces 26 and 28, a rectangularly shaped rear face 32 opposing the front face 30 and longitudinally extending between the first and second end faces 26 and 28, a rectangularly shaped first or upper side face 34 longitudinally extending between the first and second end faces 26 and 28, a rectangularly shaped second or lower side face 36 opposing the upper side face 34 and longitudinally extending between the first and second end faces 26 and 28, a first or upper beveled friction edge surface 38 longitudinally extending along a transition edge between the upper side face 34 and the rectangularly shaped rear face 32, and a second or lower beveled friction edge surface 40 longitudinally extending along a transition edge between the lower side face 36 and the rectangularly shaped rear face 32. The rectangularly shaped rear face 32 along with the upper and lower beveled friction edge surfaces 38, 40 define a rear beveled face 41 of the horizontally extending barrier 20.

The irregular hexagonal prism shaped body 22 is further comprised of a first cylindrically shaped hole 42 extending through the first end face 26 and into the elongated body 22, a second cylindrically shaped hole 44 extending through the second end face 28 and into the elongated body 22, and three spaced apart disk shaped holes 46, 48, and 50 extending through the rear face 32 and into the elongated body 22.

Figure 3:
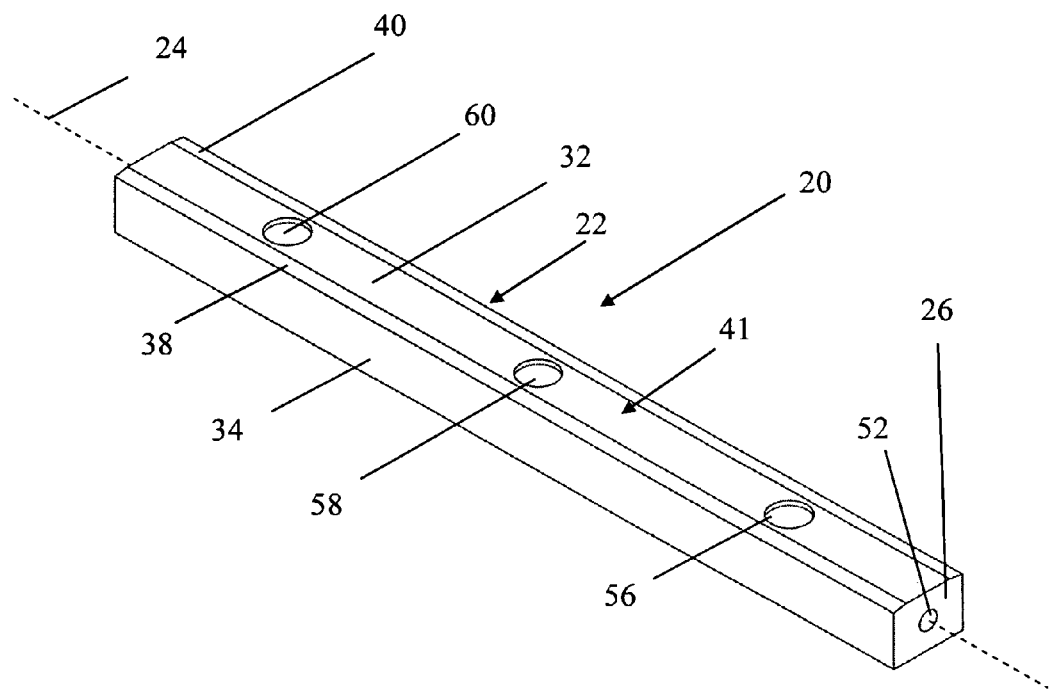
FIG. 3 is a first side, first end, and rear perspective view of an embodiment of a horizontally extending barrier or tactile feedback member illustrated in FIG. 1.
Figure 4:
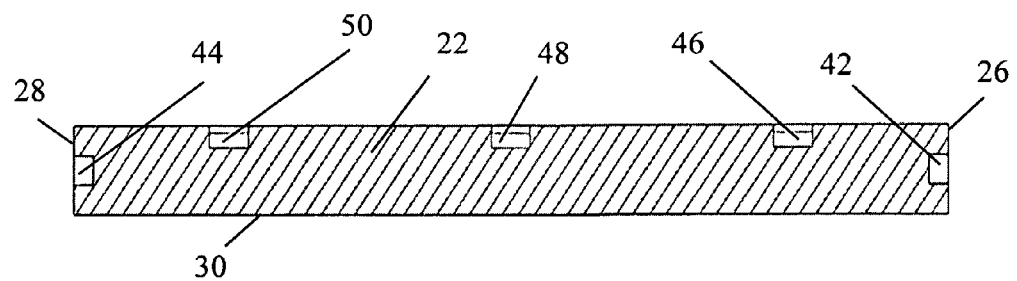
FIG. 4 is a longitudinal sectional view of the horizontally extending barrier or tactile feedback member illustrated in FIG. 3.

Additionally, each horizontally extending barrier 20 is comprised of a first cylindrically shaped magnet 52 complemental in shape to and received within the first cylindrically shaped hole 42 so as to be flush with the first end face 26 of the body 22 as illustrated in FIG. 3.

Figure 5:
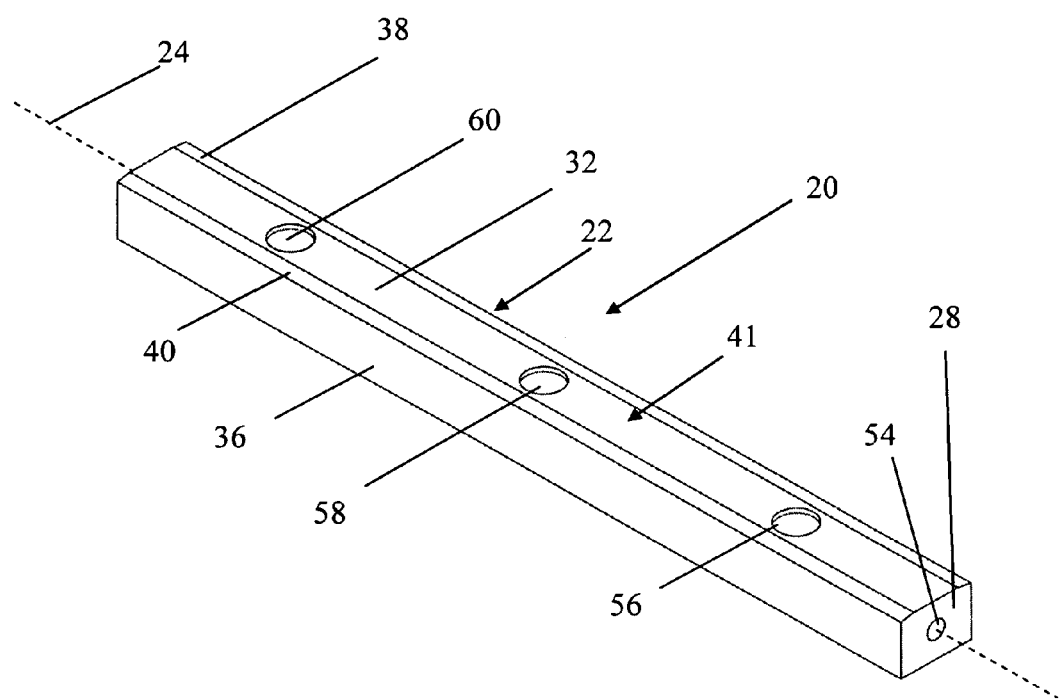
FIG. 5 is a second side, second end, and rear perspective view of the horizontally extending barrier or tactile feedback member illustrated in FIG. 3.
Figure 6:
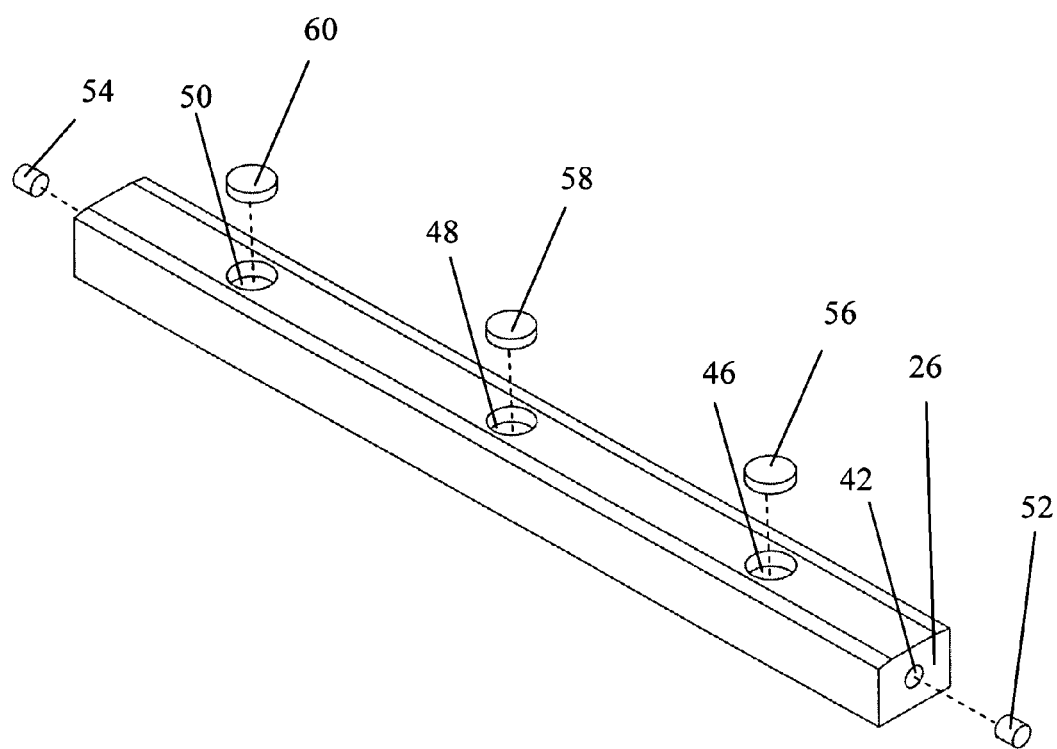
FIG. 6 is exploded parts view of the horizontal barrier illustrated in FIG. 3 from the first side, first end, and rear thereof.
Figure 7:
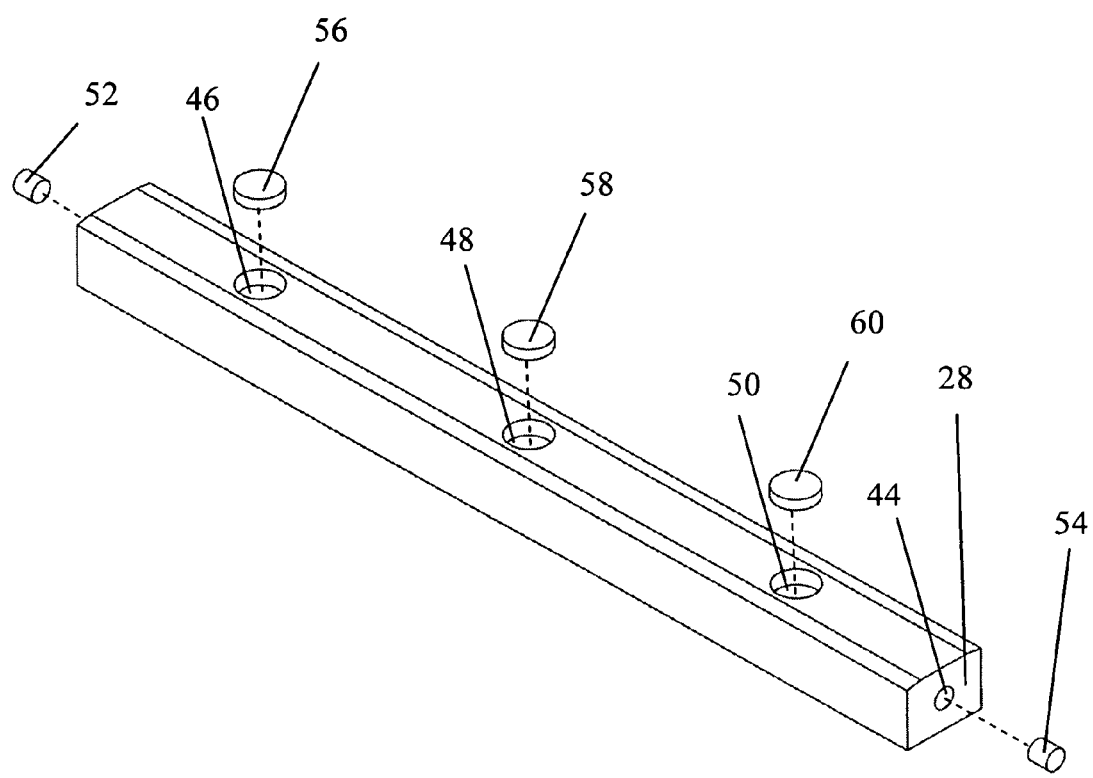
FIG. 7 is exploded parts view of the horizontal barrier illustrated in FIG. 3 from the second side, second end, and rear thereof.

Furthermore, each horizontally extending barrier 20 is comprised of a second cylindrically shaped magnet 54 complemental in shape to and received within the second cylindrically shaped hole 44 so as to be flush with the second end face 28 of the body 22 as illustrated in FIG. 5.

Figure 8:
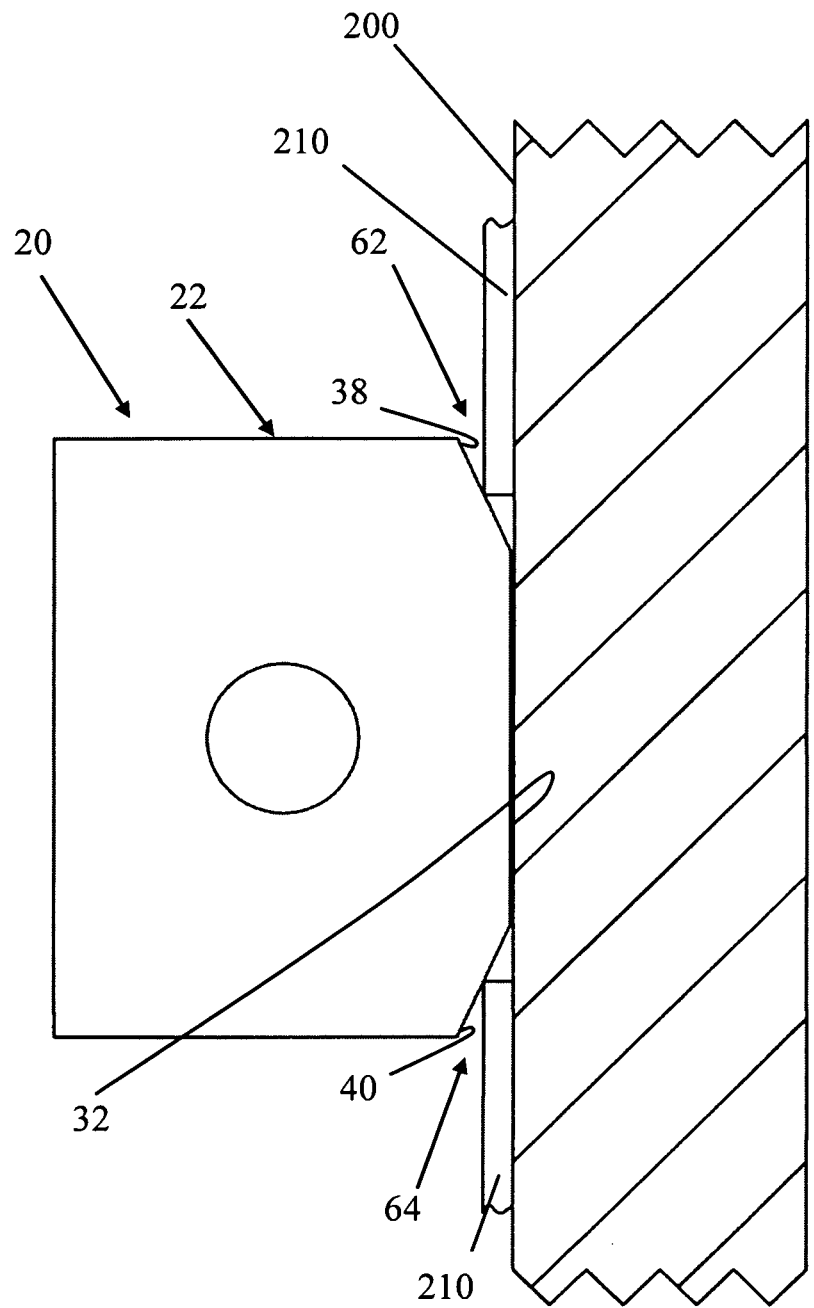
FIG. 8 is an enlarged first side elevational view of the horizontal barrier illustrated in FIG. 3 and further illustrating a fragmentary side elevational view of two medium in the form of index cards being frictionally secured in place and a fragmentary side sectional view of the magnetic white board.

Moreover, each horizontally extending barrier 20 is further comprised of three disk shaped magnets 56, 58, and 60 complemental in shape to, but thinner than, the three spaced apart disk shaped holes 46, 48, and 50 in which the three disk shaped magnets 56, 58, and 60 are respectively received within so as to be recessed within the body 22 and recessed from the rectangularly shaped rear face 32 of the body 22 as illustrated in FIGS. 3 and 5. With the three disk shaped magnets 56, 58, and 60 respectively recessed within the three spaced apart disk shaped holes 46, 48, and 50, the rectangularly shaped rear face 32 is allowed to directly abut against the magnetic working surface or the planar magnetic white board 200 in a flush manner. The abutment of the rectangularly shaped rear face 32 against the magnetic working surface or the planar magnetic white board 200 allows each medium 210 to be placed within one of a pair of beveled or acute angle openings 62, 64 (FIG. 8) and frictionally engaged between one of the pair of opposed beveled friction edge surfaces 38, 40 of the body 22 of the horizontally extending barrier 20 and the magnetic working surface or the planar magnetic white board 200 for locating and frictionally securing one or more mediums 210 above and below the body 22 of the horizontally extending barrier 20.

The first and second cylindrically shaped magnets 52, 54 have alternating poles faces (North, South) flush with the first and second end faces 26 and 28 for allowing a plurality of horizontally extending barriers 20 to magnetically couple to one another (North of one to South of another) and to magnetically couple to one vertically extending barrier 70 at each end face 26 and 28 as further delineated below.

Vertically Extending Barrier 70

Referring now to FIGS. 9 through 13, each vertically extending barrier 70 is comprised of an elongated body 72 having a longitudinal axis 74 and, one embodiment, having a shape of a square cuboid or right square prism generally having a square transverse cross-section. The square cuboid shaped body 72 is comprised of a pair of spaced apart square shaped first and second end faces 76 and 78, a rectangularly shaped front face 80 longitudinally extending between the first and second end faces 76 and 78, a rectangularly shaped rear face 82 opposing the front face 80 and longitudinally extending between the first and second end faces 76 and 78, a rectangularly shaped first or inner side face 84 longitudinally extending between the first and second end faces 76 and 78, and a rectangularly shaped second or outer side face 86 opposing the inner side face 84 and longitudinally extending between the first and second end faces 76 and 78.

The square cuboid shaped body 72 is further comprised of a first cylindrically shaped hole 92 extending through the inner side face 84 and into the body 72, a second cylindrically shaped hole 94 extending through the outer side face 86 and into the body 72, and a single disk shaped hole 96 extending through the rear face 82 and into the body 72.

Figure 9:
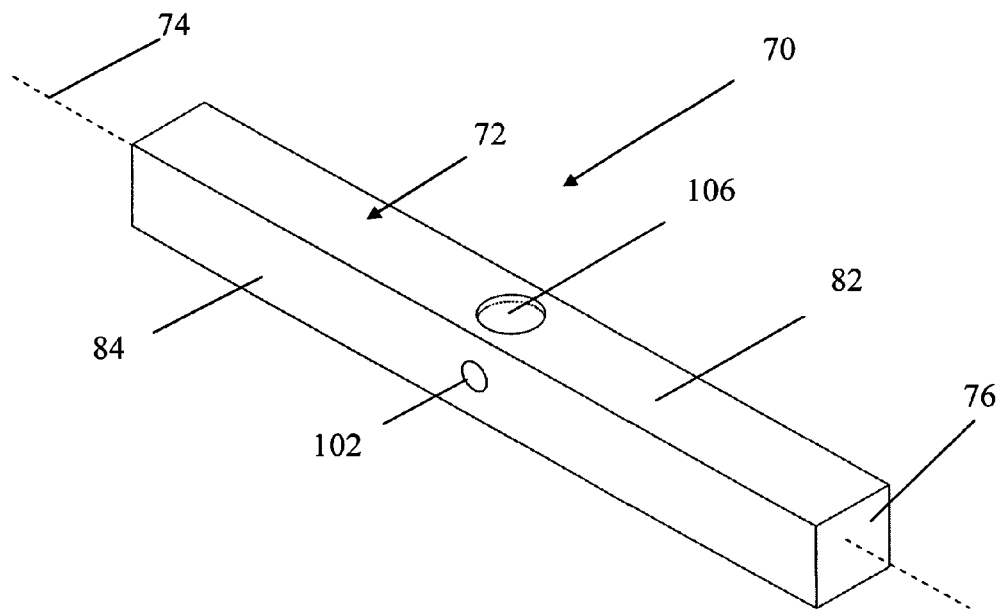
FIG. 9 is a first side, first end, and rear perspective view of an embodiment of a vertically extending barrier or tactile feedback member illustrated in FIG. 1.
Figure 10:
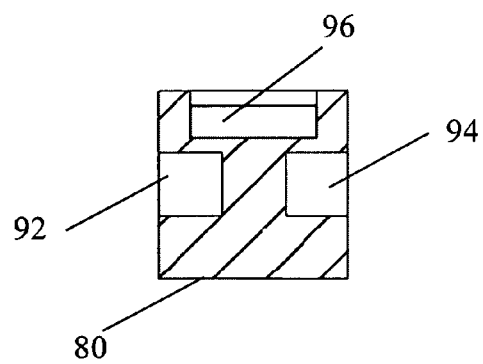
FIG. 10 is a transverse sectional view of the vertically extending barrier or tactile feedback member illustrated in FIG. 9.
Figure 11:
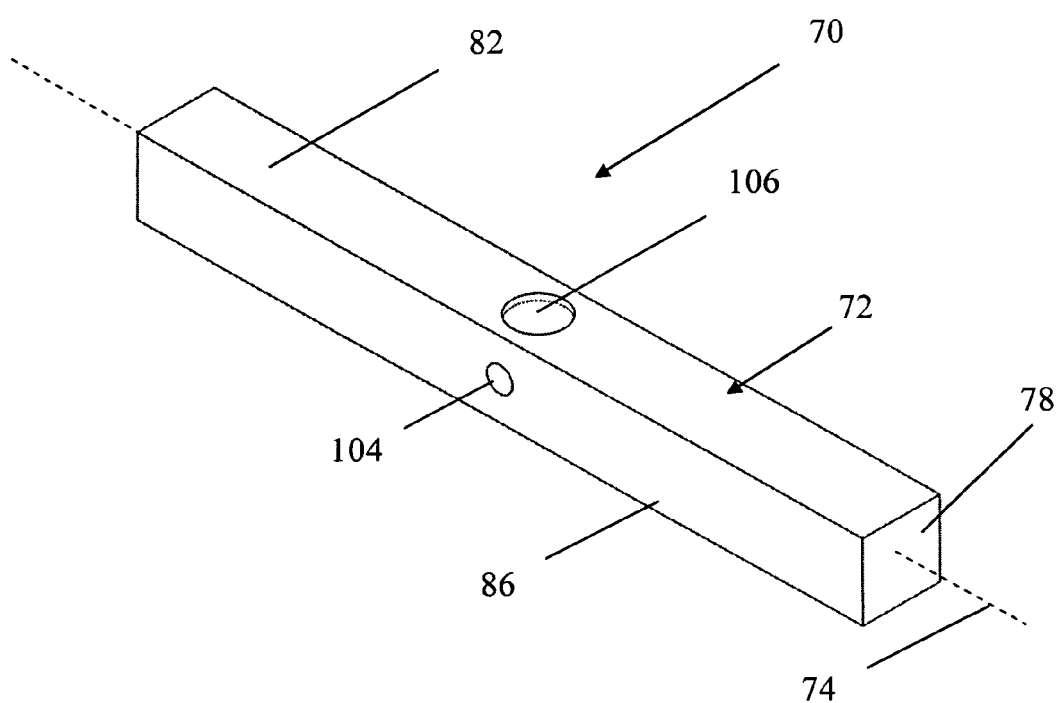
FIG. 11 is a second side, second end, and rear perspective view of the vertically extending barrier or tactile feedback member illustrated in FIG. 9.
Figure 12:
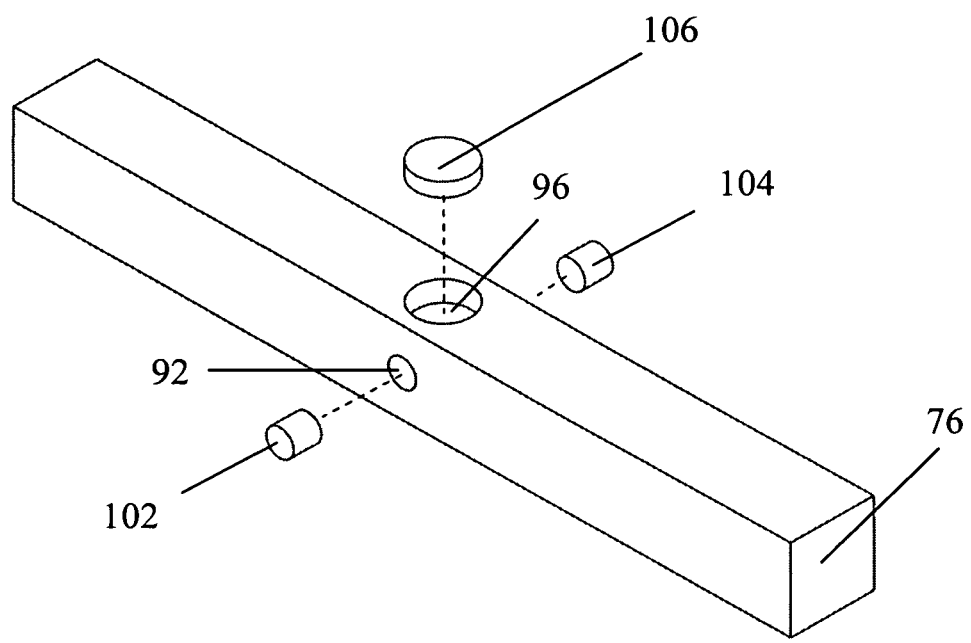
FIG. 12 is exploded parts view of the vertically barrier illustrated in FIG. 9 from the first side, first end, and rear view thereof.
Figure 13:
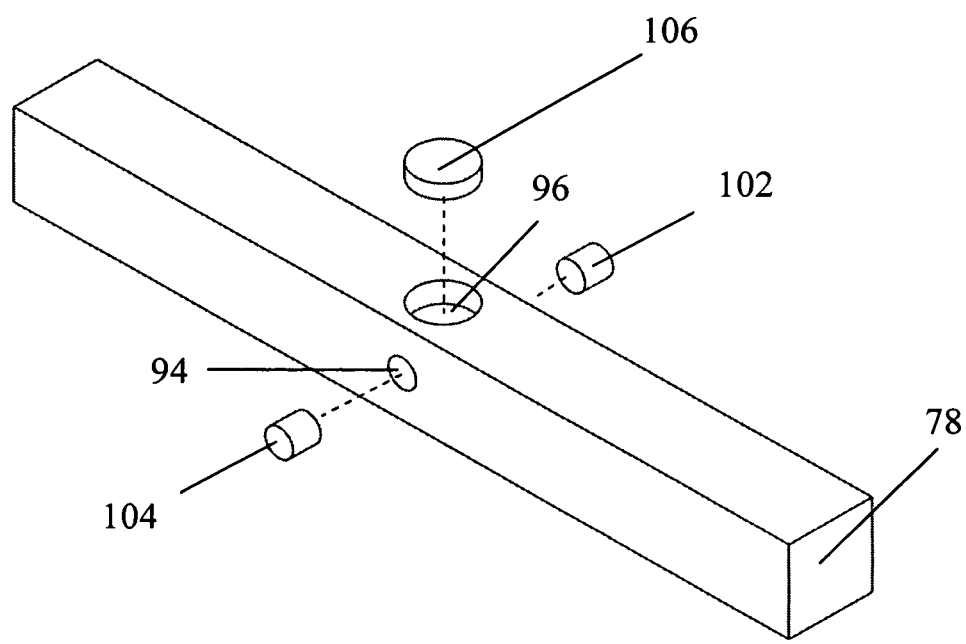
FIG. 13 is exploded parts view of the horizontal barrier illustrated in FIG. 9 from the second side, second end, and rear view thereof.

Additionally, each vertically extending barrier 70 is comprised of a first cylindrically shaped magnet 102 complemental in shape to and received within the first cylindrically shaped hole 92 so as to be flush with the inner side face 84 of the body 72 as illustrated in FIG. 9. Furthermore, each vertically extending barrier 70 is comprised of a second cylindrically shaped magnet 104 complemental in shape to and received within the second cylindrically shaped hole 94 so as to be flush with the outer side face 86 of the body 72 as illustrated in FIG. 11. Moreover, each vertically extending barrier 70 is further comprised of a single disk shaped magnet 106 complemental in shape to, but thinner than, the single disk shaped hole 96 in which the disk shaped magnet 106 is received within the single disk shaped hole 96 so as to be recessed within the body 72 and recessed from the rectangularly shaped rear face 82 of the body 72 as illustrated in FIGS. 9 and 11. With the disk shaped magnet 106 recessed within the disk shaped hole 96, the rectangularly shaped rear face 82 is allowed to directly abut against the magnetic working surface or the planar magnetic white board 200 in a flush manner.

The first and second cylindrically shaped magnets 102 and 104 have alternating poles faces (North, South) which allows one end face of one the plurality of horizontally extending barriers 20 to be magnetically coupled to one side face of the vertically extending barrier 70 and another end face of another of the plurality of horizontally extending barriers 20 to be magnetically coupled the other side face of the vertically extending barrier 70 so that process of coupling the horizontally extending barrier 20 and the vertically extending barrier 70 to the white board and to one another can be repeated as necessary and in any sequence for providing horizontally and vertically extending visual and/or tactile feedback barriers or elements for defining upper and lower partitioned work areas and left and right partitioned work areas such that one or more visual and/or tactile medium 210 can be placed in each of the partitioned work areas.

Abbreviated Horizontally Extending Barrier 120

Referring to FIGS. 14 through 17, and in one embodiment, the system 10 is further comprised of an abbreviated horizontally extending barrier 120. Analogous to horizontally extending barrier 20, the abbreviated horizontally extending barrier 120 is comprised of an elongated body 122 having a longitudinal axis 124 and, one embodiment, having a shape of an irregular hexagonal prism generally having an irregular hexagonal transverse cross-section. The irregular hexagonal prism shaped body 122 is comprised of a pair of spaced apart rectangularly shaped first and second end faces 126 and 128, a rectangularly shaped front face 130 longitudinally extending between the first and second end faces 126 and 128, a rectangularly shaped rear face 132 opposing the front face 130 and longitudinally extending between the first and second end faces 126 and 128, a rectangularly shaped first or upper side face 134 longitudinally extending between the first and second end faces 126 and 128, a rectangularly shaped second or lower side face 136 opposing the upper side face 134 and longitudinally extending between the first and second end faces 126 and 128, a first or upper beveled friction edge surface 138 longitudinally extending along a transition edge between the upper side face 134 and the rectangularly shaped rear face 132, and a second or lower beveled friction edge surface 140 longitudinally extending along a transition edge between the lower side face 136 and the rectangularly shaped rear face 132. The rectangularly shaped rear face 132 along with the upper and lower beveled friction edge surfaces 138, 140 define a rear beveled face 141 of the abbreviated horizontally extending barrier 120.

The irregular hexagonal prism shaped body 122 is further comprised of a first cylindrically shaped hole 142 extending through the first end face 126 and into the elongated body 122, a second cylindrically shaped hole 144 extending through the second end face 128 and into the elongated body 122, and two spaced apart disk shaped holes 146 and 148 extending through the rear face 132 and into the elongated body 122.

Figure 14:
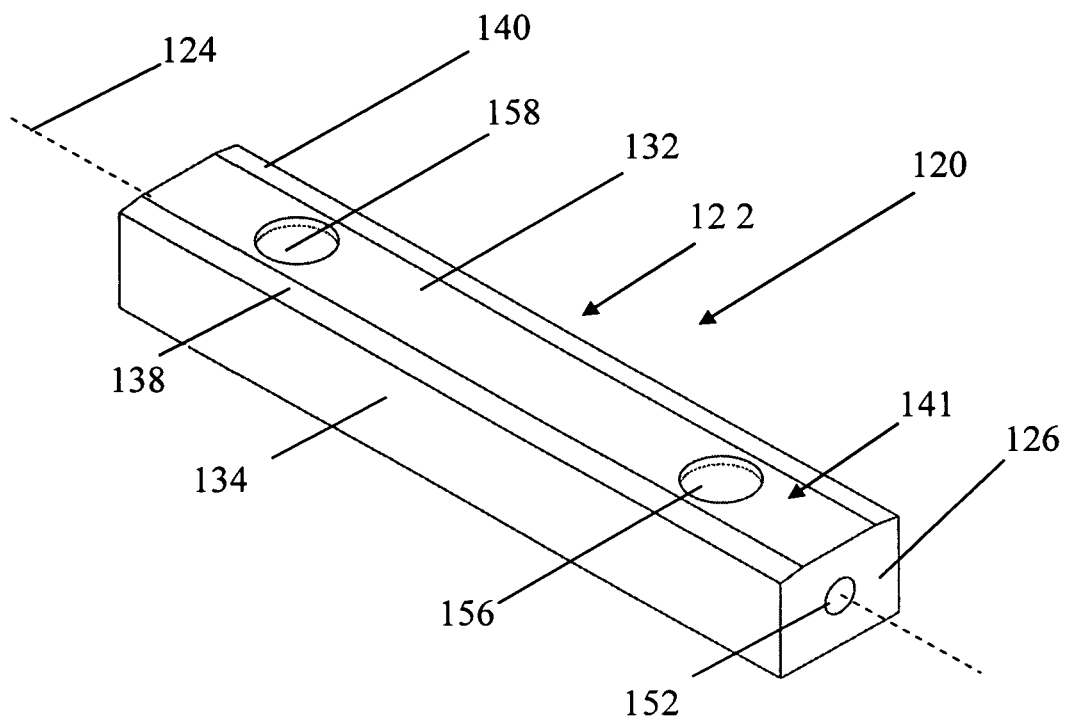
FIG. 14 is a first side, first end, and rear perspective view of an embodiment of an abbreviated horizontally extending barrier or tactile feedback member.
Figure 15:
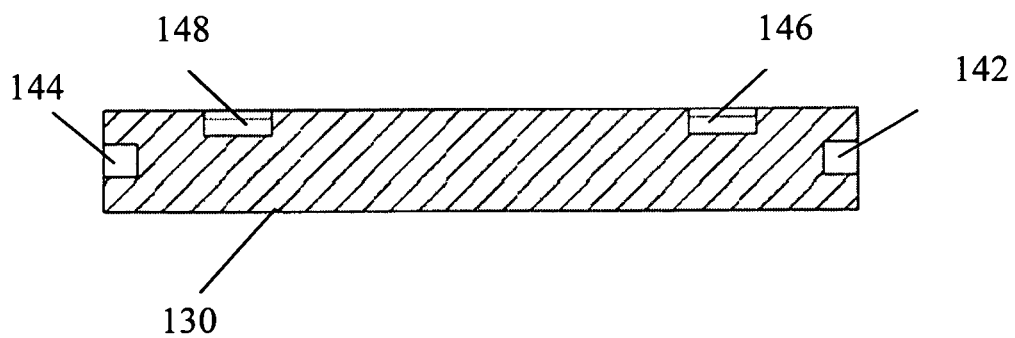
FIG. 15 is a longitudinal sectional view of the abbreviated horizontally extending barrier or tactile feedback member illustrated in FIG. 14.
Figure 16:
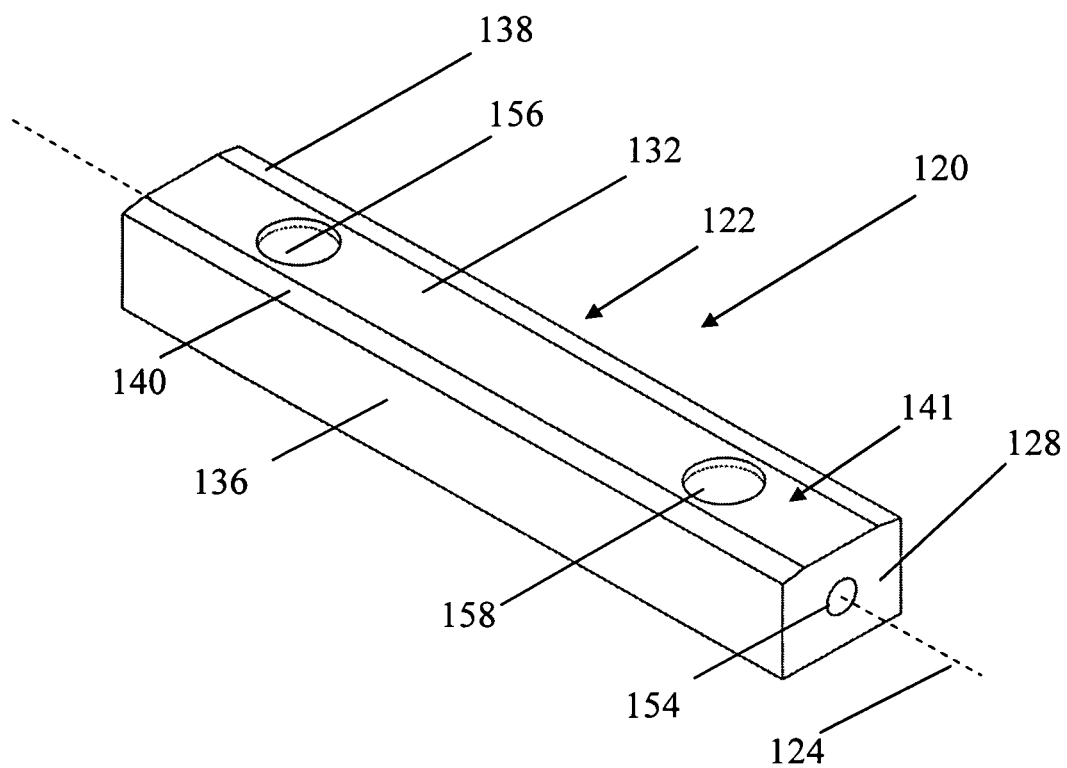
FIG. 16 is a second side, second end, and rear perspective view of the abbreviated horizontally extending barrier or tactile feedback member illustrated in FIG. 14.
Figure 17:
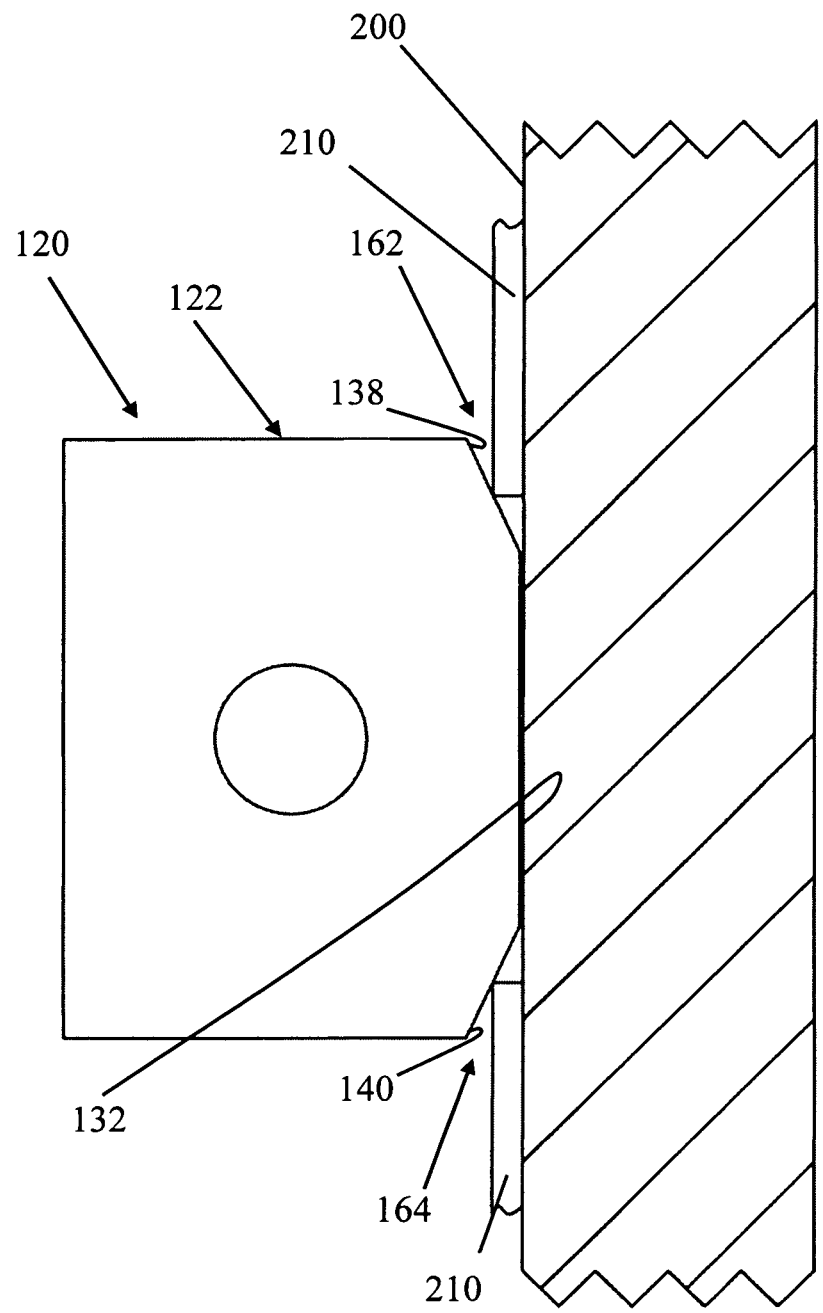
FIG. 17 is an enlarged first side elevational view of the abbreviated horizontal barrier illustrated in FIG. 14 and further illustrating a fragmentary side elevational view of two medium in the form of index cards being frictionally secured in place and a fragmentary side sectional view of the magnetic white board.

Additionally, each abbreviated horizontally extending barrier 120 is comprised of a first cylindrically shaped magnet 152 complemental in shape to and received within the first cylindrically shaped hole 142 so as to be flush with the first end face 126 of the body 122 as illustrated in FIG. 14. Furthermore, each abbreviated horizontally extending barrier 120 is comprised of a second cylindrically shaped magnet 154 complemental in shape to and received within the second cylindrically shaped hole 144 so as to be flush with the second end face 128 of the body 122 as illustrated in FIG. 16. Moreover, each abbreviated horizontally extending barrier 120 is further comprised of two disk shaped magnets 156 and 158 complemental in shape to, but thinner than, the two spaced apart disk shaped holes 146 and 148 in which the two disk shaped magnets 156 and 158 are respectively received within so as to be recessed within the body 122 and recessed from the rectangularly shaped rear face 132 of the body 122 as illustrated in FIGS. 14 and 16. With the two disk shaped magnets 156 and 158 respectively recessed within the two spaced apart disk shaped holes 146 and 148 the rectangularly shaped rear face 132 is allowed to directly abut against the magnetic working surface or the planar magnetic white board 200 in a flush manner.

Figure 18:
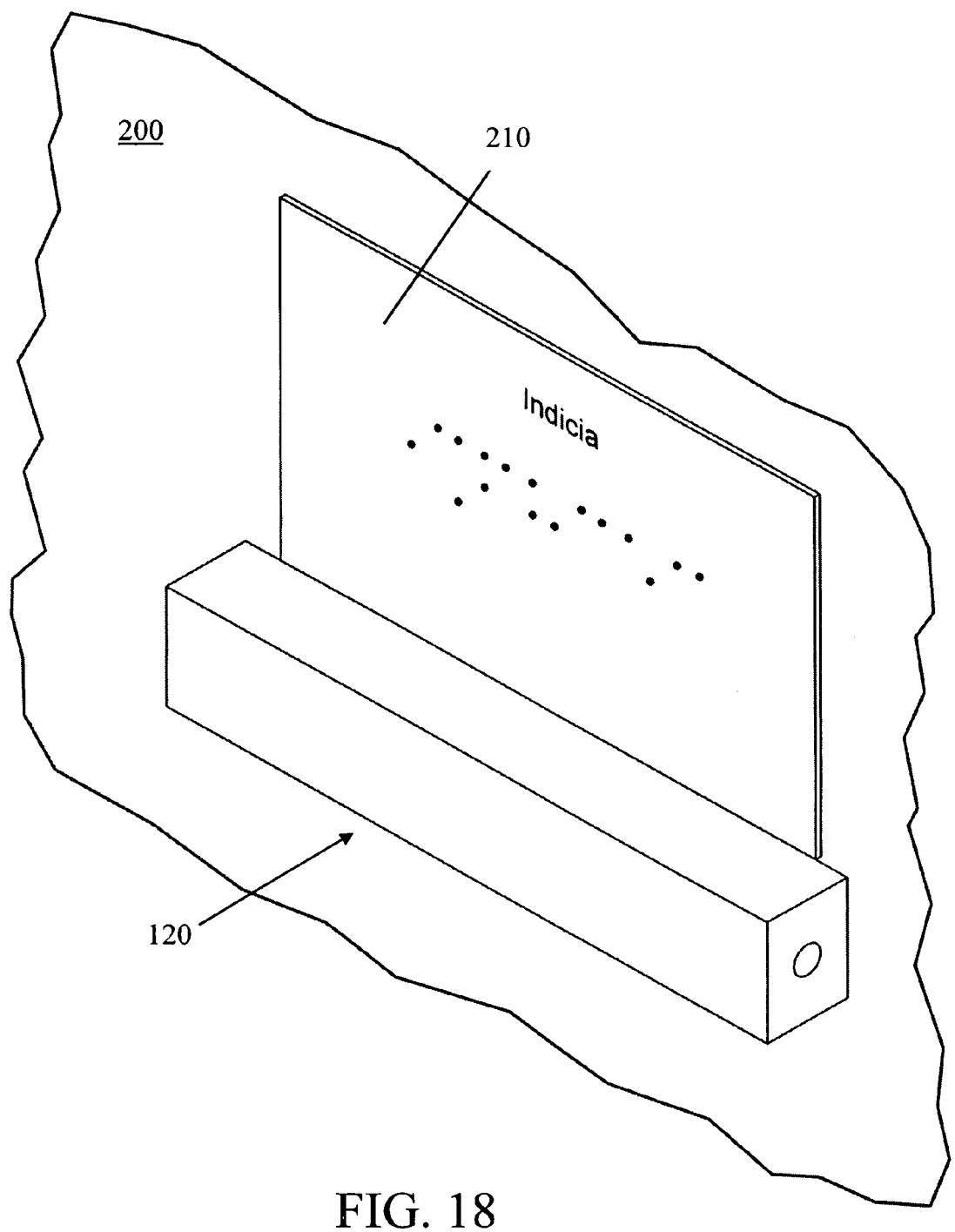
FIG. 18 is the first side, first end, and rear perspective view of an embodiment of the abbreviated horizontally extending barrier or tactile feedback member and further illustrating a perspective view of a medium in the form of an index card being frictionally secured in place above the abbreviated horizontally extending barrier or tactile feedback member.
Figure 19:
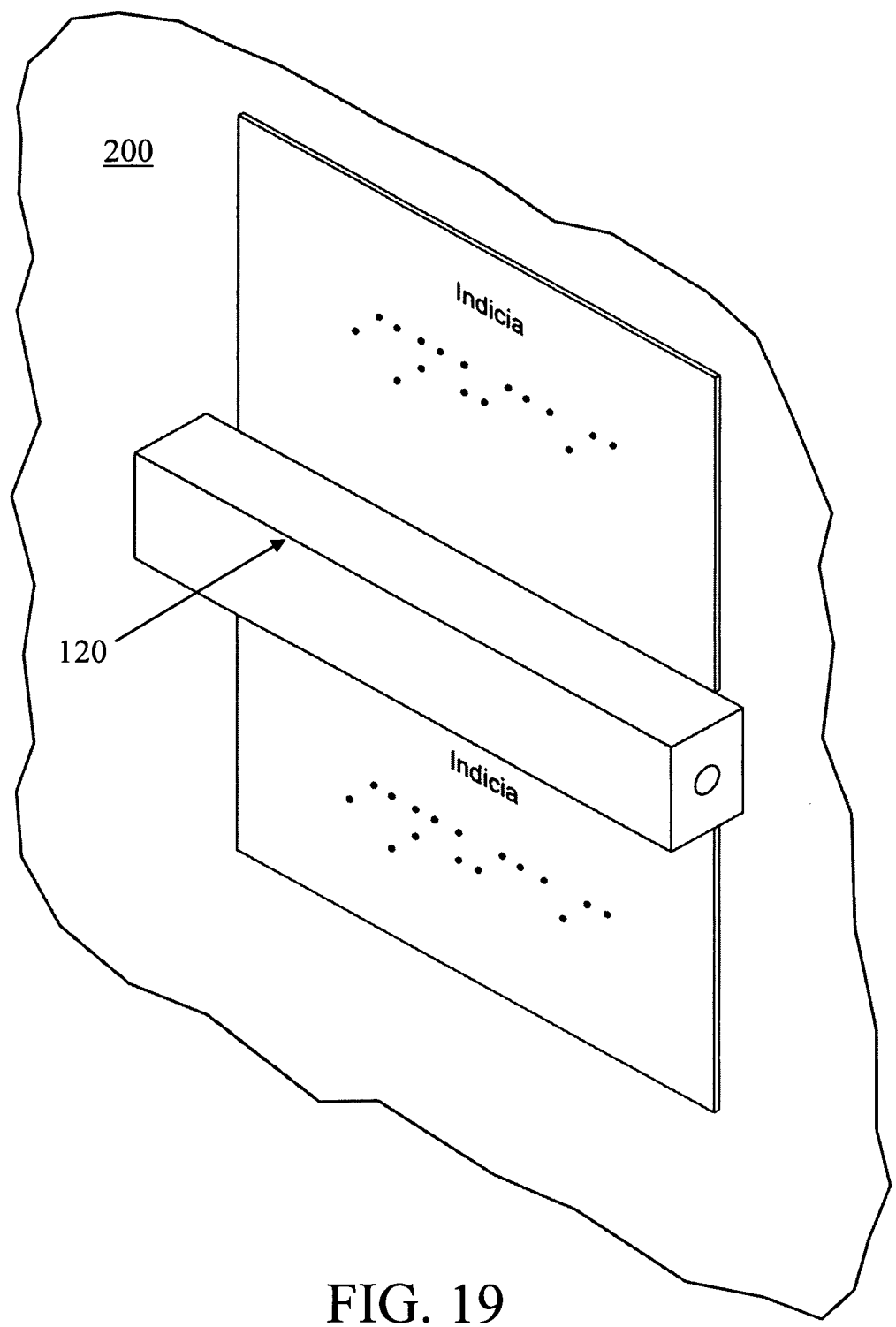
FIG. 19 is the first side, first end, and rear perspective view of an embodiment of the abbreviated horizontally extending barrier or tactile feedback member and further illustrating a perspective view of a first medium in the form of a first index card being frictionally secured in place above the abbreviated horizontally extending barrier or tactile feedback member and a second medium in the form of a second index card being frictionally secured in place below the abbreviated horizontally extending barrier or tactile feedback member.

The abutment of the rectangularly shaped rear face 132 against the magnetic working surface or the planar magnetic white board 200 allows each medium 210 to be placed within one of a pair of beveled or acute angle openings 162, 164 (FIG. 17) and frictionally engaged between one of the pair of opposed beveled friction edge surfaces 138, 140 of the body 122 of the abbreviated horizontally extending barrier 120 and the magnetic working surface or the planar magnetic white board 200 for locating and frictionally securing, for example, one three inch by five inch index card or medium 210 above and/or below the body 122 of the abbreviated horizontally extending barrier 120 as illustrated in FIGS. 18 and 19.

Figure 21:
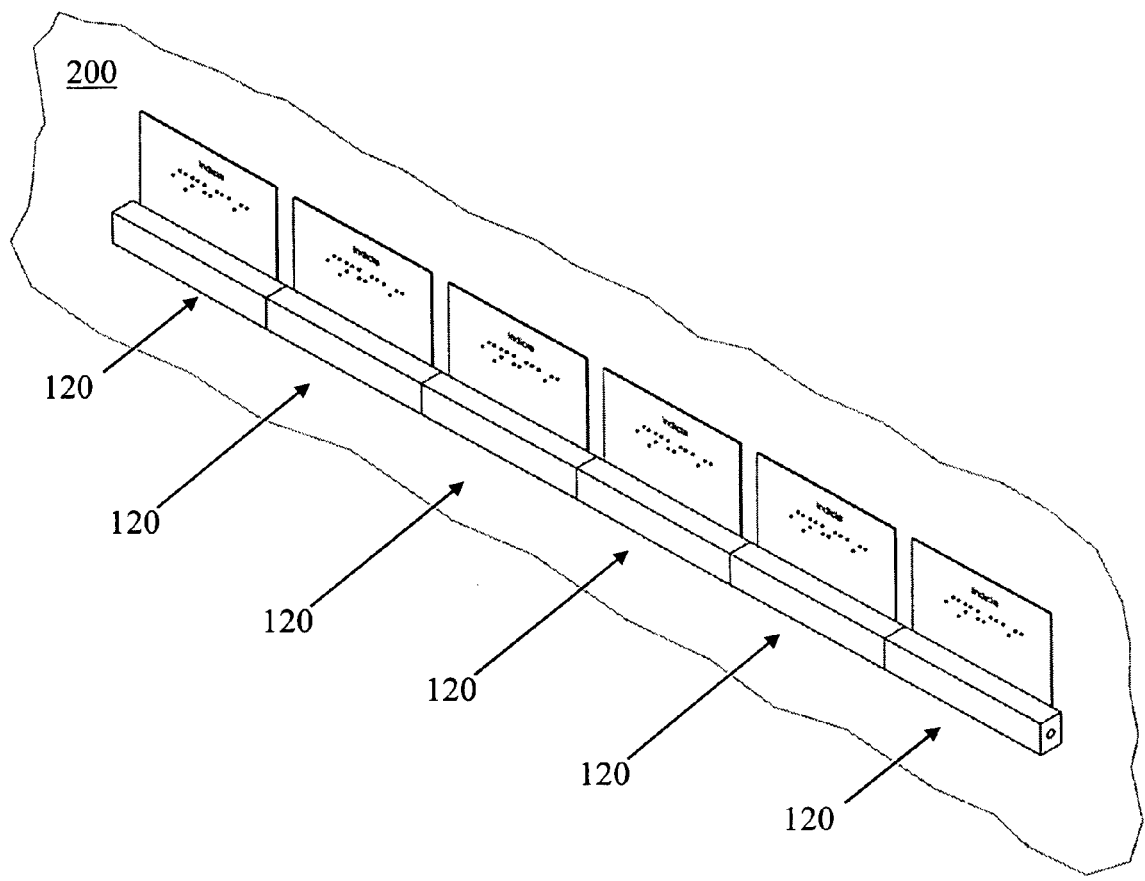
FIG. 21 a perspective view of an embodiment of the system for conceptualizing spatial concept utilizing six abbreviated horizontally extending barriers or tactile feedback members in an example of use of operation.

The first and second cylindrically shaped magnets 152, 154 have alternating poles faces (North, South) flush with the first and second end faces 126 and 128 for allowing a plurality of abbreviated horizontally extending barriers 120 to magnetically couple to one another (North of one to South of another) as illustrated in FIG. 21 and to magnetically couple to one vertically extending barrier 70 at each end face 126 and 128 analogous by replacing barrier 20 with barrier 120 in FIGS. 1 and 2.

Exemplary Dimensions and Materials of Barriers 20, 70, and 120

In one embodiment, the horizontally extending barrier 20 has a length, width, and height dimension that is 11.25 inches×1 inch×0.75 inch and is held to the magnetic white board 200 by three 0.5 inch diameter×0.125 inch thick disc magnets formed from, but not limited to, Neodymium Iron Boron (NdFeB)—Grade N45. A single 0.25 inch diameter× 0.25 inch thick cylinder magnet formed from, but not limited to, Neodymium Iron Boron (NdFeB)—Grade N42 is inserted into each end of the horizontally extending barrier 20.

Additionally, and in one embodiment, the abbreviated horizontally extending barrier 120 has a length, width, and height dimension that is 5.625 inches×1 inch×0.75 inch and is held to the magnetic white board 200 by two 0.5 inch diameter×0.125 inch thick disc magnets formed from, but not limited to, Neodymium Iron Boron (NdFeB)—Grade N45. A single 0.25 inch diameter×0.25 inch thick cylinder magnet formed from, but not limited to, Neodymium Iron Boron (NdFeB)—Grade N42 is inserted into each end of the abbreviated horizontally extending barrier 120.

Furthermore, and in one embodiment, both the horizontally extending barrier 20 and the abbreviated horizontally extending barrier 120 have a beveled surface above and below the disc magnets. The bevel is inset 0.03125 of an inch from the outside edge and is angled at 9.5 degrees, leaving a 0.625 of an inch flat surface centered from top to bottom along the 1 inch surface to allow the magnets to be inset for barrier 20 and 120. With respect to barrier 20, two of the three magnets are placed 2 inches in from each end with the third magnet placed 5.625 inches from either end (centered). With respect to barrier 120, each magnet is placed 1 inch from each end. The 0.25 of an inch magnet disposed in each end of the barriers 20 and 120 are centered therein as illustrated.

Moreover, the vertically extending barrier 70 has a length, width, and height dimension that is 7 inches×0.75 inch×0.75 inch and is held to the magnetic white board 200 by one 0.5 inch diameter×0.125 inch thick disc magnets formed from, but not limited to, Neodymium Iron Boron (NdFeB)—Grade N45. The single disc magnet is placed on center 3.5 inches× 0.375 inch. Each of the two side faces 84, 86 adjacent to the side with the single disc magnet has one 0.25 inch diameter× 0.25 inch thick cylinder magnet formed from, but not limited to, Neodymium Iron Boron (NdFeB)—Grade N42 that is inserted on center at 3.5 inches×0.375 inch.

As illustrated in the drawings and described above, barriers 20, 70, and 120 are each held to the magnetic white board 200 by various numbers of 0.5 inch diameter×0.125 inch thick Neodymium Iron Boron NdFeB—Grade N45 disc magnets. Each piece may be connected to one another in any combination by coupling the opposite poles of the 0.25 inch diameter×0.25 inch thick Neodymium NdFeB—Grade N42 cylinder magnets inserted into the pieces as described above. Any number of combinations of the barriers 20, 70, and 120 may be made by the user as each piece can be moved about on the magnetic white board 200.

The bevel on barriers 20 and 120 is such that it can firmly hold ordinary three inch by five inch index cards either above or below the midline of the barrier.

As illustrated in the certain views of the drawings, each barrier 20 can support four three inch by five inch index cards, two on top and two on the bottom, while barrier 120 can support two three inch by five inch index cards, one on top and one on the bottom.

Making Barriers 20, 70, and 120

Each of the barriers 20, 70, and 120 is typically constructed of, but not limited to, a plastic material such as a rigid PVC plastic or a wood material such as a hardwood.

For example, barrier 20, 70, and 120 can be formed of a rigid PVC plastic by known plastic forming techniques. Additionally, and for example, barrier 20, 70, and 120 can be formed of a wood material such as an African Hardwood called Bubinga. When using Bubinga, each barrier can be formed by using rough 4/4 lumber that is first surface planed, using a surface planer, to $13/16$ of inch thickness. The surfaced lumber is then cut into either 1.05 inches or 0.78 inch strips to accommodate the height for each barrier. Each strip is cut into lengths of 11.25 inches, 5.625 inches, or 7 inches to accommodate the length of each barrier, by using a power miter saw. Each individual piece is then taken to a 12 inch drill press that has had a 0.5 inch Forstner bit installed to drill 0.5 inch holes for each 0.5 inch diameter×0.125 inch thick Neodymium Iron Boron NdFeB Grade—N45 disc magnet idiosyncratic to each barrier as described above. Next, each piece is placed on a horizontal boring machine installed with a 0.25" drill bit and a 0.25" hole is drilled for each 0.25 inch diameter×0.25 inch thick Neodymium NdFeB Grade—N42 cylinder magnet idiosyncratic to each barrier as described above. After all holes are drilled, each piece is finish sanded using a drum sander and hand sanded as required. A sled jig is used next to cut the slight bevel for barrier 20 and 120. The sled jig fits in a track on the table saw surface and holds each piece for barrier 20 and 120 at the proper 9.5 degree angle. The sled is pushed forward, feeding each piece through the saw blade, nipping off the bevel. Each piece is then flipped as to allow beveling of the opposite side. Once beveling is complete, the magnets are glued in place using, for example, a cyanoacrylate glue and then a natural colored Danish Oil is applied to preserve the wood and finish.

In Use and Operation

In one embodiment, and referring to the drawings, the system 10 for conceptualizing spatial concepts is utilized for use on a magnetic white board 14. As shown in the drawings, and in one embodiment, the medium 210 depicts 3 inch by 5 inch index cards, the user places text on a card, in print and/or in Braille.

Figure 20:
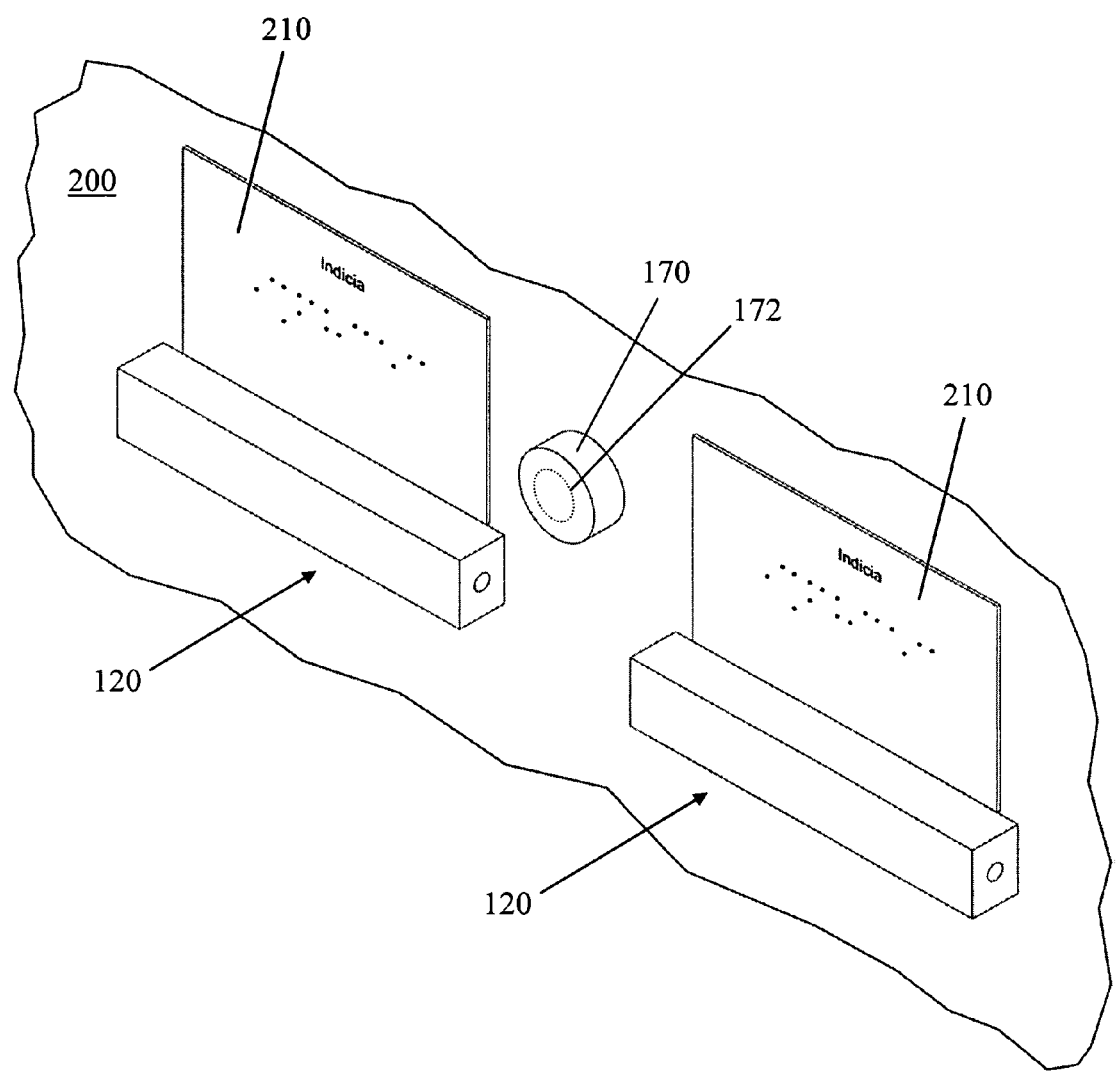
FIG. 20 a perspective view of an embodiment of two abbreviated horizontally extending barriers or tactile feedback members each supporting a medium interposed by a multiplication member.

Originally, and in one embodiment, the system 10 for conceptualizing spatial concepts was employed to teach dimensional analysis equations to blind chemistry students by separating the value from the label in each term used in the calculation. The value is either brailed or written on one card, with the label either brailed or written on the second card, and then the two cards are placed in either the numerator or denominator of the given fraction as required. Barrier 20 is used horizontally as the fraction line separating the numerator from the denominator when four cards are required. Barrier 120 also separates the numerator from denominator when only two cards are needed. And, barrier 70 is used vertically as the separator from each fraction and, in one embodiment, is assumed to be the multiplication indicator in equations requiring multiple multiplications of fractions. In another embodiment, and referring to FIG. 20, a disk or knob shaped member 170 comprised of a disk shaped magnet 172 imbedded in the back of the knob shaped member 170 is employed as the multiplication indicator.

Each of the barriers 20, 70, and 120 is manipulated independently by the user (either teacher or student) and linked together in any number of combinations as required by the equation. When calculating, the user "cancels" the labels by removing like labels from the numerators and denominators. The desired label should then be remaining, leaving the user to multiply all of the numerators together, multiply all of the denominators together, and then divide the numerator product by the denominator product. This quotient is then placed next to the remaining label, providing the proper response.

A multitude of educational concepts among all educational disciplines and ability levels can be taught with this system. With each concept, the system 10 is manipulated as needed by the user by connecting as many barriers 20, 70, and 120 or as few barriers 20, 70, and 120 as required to teach the concept.

For example, the following exemplifies some of the academic concepts that can be taught with the system for conceptualizing spatial concepts:

Math: Place Value, Metric Conversion, Abacus, Factor Label Mathematics, Nemeth Alignment, Number Lines, Matrix Logic, Functions (x, y), Graphing (Bar Graphs, Scatter Plots, Stem & Leaf), Algebra, Equations/Variables, Perimeter/Area, and Measurement.

Science: Linear Measurement (English, SI Units), Dimensional Analysis, Graphing, Chemical Equations (Writing, Balancing), Ionic Equations (Complete, Net), Stoichiometry, and Punnett Squares.

Braille: Slate and Stylus Skills, Independent Hand Recognition, and Tracking.

Language Arts: Sentence Structure and Sentence Writing.

O&M: Directionality, Intersections, and Blocks.

History: Time Lines.

Diagramming: Brainstorming, Venn Type, Pro/Con, Compare/Contrast, and Flow Chart.

Additional concepts can also be taught as teacher needs and creativity develop.

Further Detailed Use and Operation

In general, and as noted in detail hereinabove, the system 10 is comprised of one or more horizontally extending barriers 20 each comprised of upper beveled friction edge surface 38 and lower beveled friction edge surface 40. Additionally, the system 10 is comprised of one or more abbreviated horizontally extending barriers 120 each comprised of upper beveled friction edge surface 138 and lower beveled friction edge surface 140. The beveled friction edge surfaces 38, 40 and 138, 140 are designed to use friction to hold, in one embodiment, note cards between the barriers 20, 120 and the white board 200. Accordingly, medium 210 in the form of index cards can be inserted between the beveled friction edge surfaces 38, 40 and 138, 140 and the white board 200 to create a variety of learning experiences while being held firmly in place in order to allow blind users the ability to read what has been brailled on them.

Now, a further example of use and operation of the system 10 for conceptualizing spatial concepts is detailed below.

Dimensional Analysis Detailed Example

Figure 22:
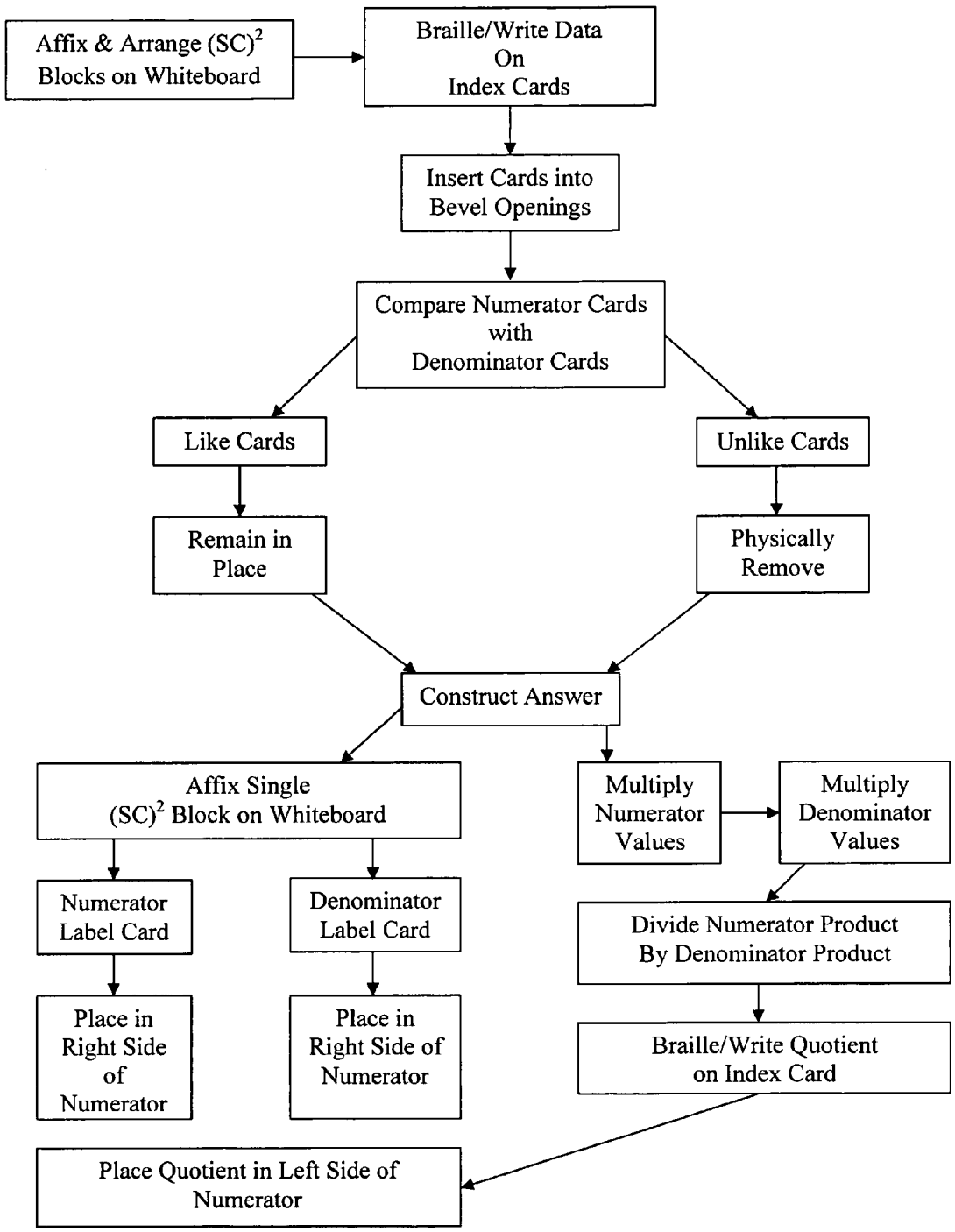
FIG. 22 is flow diagram of an embodiment of utilization of the system for conceptualizing spatial concepts for dimensional analysis.

An example of a detailed dimensional analysis method is illustrated in the flow diagram of FIG. 22 and will now be delineated in detail below.

Begin by affixing one horizontally extending barrier 20 along a horizontal axis to the white board 200 at a comfortable height for the user. This is done by placing the rectangularly shaped rear face 32 face in contact with the white board 200. Next, affix one vertically extending barrier 70 to the white board 200 along a vertical axis while attaching it to the right end magnet of the one horizontally extending barrier 20. If the polarity of the attaching magnets is identical, rotate either the vertically extending barrier 70 or the horizontally extending barrier 20 one-hundred-eighty degrees in order to align magnets of opposite polarity and connect the barriers. The completed arrangement will resemble a "T" that has been rotated ninety degrees clockwise. Affix a second horizontally extending barrier 20 along the same horizontal axis as the first one, attaching it to the right end magnet in the vertically extending barrier 70 by connecting the magnets (rotate the second horizontally extending barrier 20 to align magnet polarity as needed). Continue adding pieces in this manner until you have the desired number of horizontally extending barriers 20 aligned along one horizontal axis that are separated by vertically extending barriers 70. This is now a spatial representation of one or more fractions (each horizontally extending barrier 20) that will be multiplied against each other (multiplication is implied by the vertically extending barrier 70) as required by the equation being evaluated. As such, the space above each horizontally extending barrier 20 is the numerator, and the space below each horizontally extending barrier 20 is the denominator. Affix one horizontally extending barrier 20 off to the side of the working apparatus as described above. This is where the answer will be constructed.

Each term used in a dimensional analysis equation comprises a numeric value and a dimensional label. In one embodiment, the system 10 utilizes two 3×5 index cards to write each term. The numeric value is written and/or brailled on one card, and the dimensional label is written and/or brailled on the second. For example, if the term is 60 seconds, the number "60" is written and/or brailled on one card and the dimensional label "seconds" is written and/or brailled on the second card. Two cards will go into each numerator or denominator space as described above. Place the numeric value to the left, and the dimensional label to the right.

Each index card is firmly inserted into the beveled opening between the horizontally extending barrier 20 and white board 200 (friction between the horizontally extending barrier 20 and white board 200 will hold it in place).

More specifically, the bottom edge of the numerator cards will slide behind the upper beveled friction edge surface 40 of the horizontally extending barrier 20, and the top edge of the denominator cards will slide behind the lower beveled friction edge surface 41 of the horizontally extending barrier 20. The completed arrangement will be spatially arranged in a manner congruent with what one would find in an algebra, chemistry, physics, or similar textbook.

To illustrate its use, the following dimensional analysis question will be used: "How many seconds are there in one year?" To evaluate this question, sixteen 3×5 cards will be used and inserted into the system 10 as follows:

As described above, affix a total of four horizontally extending barriers 20 along the same horizontal plane on the magnetic white board 200, attaching them to three vertically extending barriers 70 as previously described. This will provide a spatial arrangement of four fractions resulting in an arrangement of four numerators and four denominators. The first numerator is located in the space above the horizontally extending barrier 20 located at the far left end of the system 10. The first denominator is located in the space below the same horizontally extending barrier 20 located at the far left end of the system 10. The second numerator is located in the space above the second horizontally extending barrier 20, directly to the right of the first horizontally extending barrier 20 with the third and fourth horizontally extending barrier 20 following in the same pattern.

The index cards should be written and/or brailled on and placed as follows in order to construct each conversion factor: Numerator One: Card One: "60"; Card Two "Seconds"; Denominator One: Card Three: "1"; Card Four: "Minute"; Numerator Two: Card Five: "60"; Card Six: "Minutes"; Denominator Two: Card Seven: "1"; Card Eight: "Hour"; Numerator Three: Card Nine: "24"; Card Ten: "Hours"; Denominator Three: Card Eleven: "1"; Card Twelve: "Day"; Numerator Four: Card Thirteen: "365"; Card Fourteen: "Days"; Denominator Four: Card Fifteen: "1"; Card Sixteen: "Year."

In evaluating the dimensional analysis equations, like dimensional labels need to be cancelled during the dimensional analysis process. Do so by comparing the dimensional label cards in each numerator against the dimensional label cards in each denominator. Cancellation can only occur when a like dimensional label in a numerator and a like dimensional label in a denominator are present within the overall equation. In evaluating the above equation, the dimensional label of "seconds" in the first numerator is compared to the dimensional labels in all four denominators. There are no "seconds" labels in any of them, so it cannot be cancelled. Move to the dimensional label of "minutes" in the second numerator and compare it to the dimensional labels in all four denominators. There is the dimensional label of "minute" in the denominator of the first fraction. Though one label is singular and the other is plural, they are like dimensional labels and need to be cancelled. If this were being done in print, the evaluator would draw a diagonal line through each label. In braille, the evaluator places a beginning cancellation indicator of dots 2, 4, 6 in the cell directly before the word "minute" and an ending cancellation indicator of dots 1, 2, 4, 5, 6 in the cell directly after the word "minute". In system 10 however, the evaluator simply removes the cards that are being cancelled. Remove the two "minute" cards. Now move to the dimensional label of "hours" in the third fraction's numerator. While comparing, you should find the label of "hour" in the second fraction's denominator. Again, singular or plural does not matter, so remove these two cards to cancel this dimensional label. Continue comparing and cancelling in this manner until all of the like dimensions have been removed (cancelled) The user will be left with the dimensional labels of "seconds" in the first numerator and "year" in the fourth denominator. Take these cards and insert them into their respective positions in the single horizontally extending barrier 20 that is placed off to the side on the white board 200, making sure to place them in the right hand side. This is the desired dimensional label that the question asks for seconds in the numerator and year in the denominator, or seconds per year. Now multiply the numeric values in each numerator against each other, i.e., 60 times 60 times 24 times 365. Note this product in a convenient place, then multiply the numeric values in each denominator against each other, i.e., 1 times 1 times 1 times 1. Divide the calculated numerator product by the calculated denominator product and write and/or braille it on a new 3×5 card and insert this numeric value card into the left hand space of the numerator space of the single horizontally extending barrier 20, next to the dimensional label of "seconds". The numerator should have two cards; the numeric value of 31,536,000 and the dimensional label of "seconds", and the denominator should only have the dimensional label of "year."

Accordingly, there are 31,536,000 seconds in one year.

Reciprocal Relationship Detailed Example

The system 10 can also be used to help blind students conceptualize and understand the concept of a reciprocal relationship between numbers.

Begin by affixing one abbreviated horizontally extending barrier 120 along a horizontal axis to the white board 200 at a comfortable height for the user. This is done by placing the rear beveled face 132 against the white board 200 for allowing the disk shaped magnets 156, 158 to magnetically couple to the white board 200. The space above this abbreviated horizontally extending barrier 120 is the numerator, and the space below this abbreviated horizontally extending barrier 120 is the denominator. Firmly insert one 3×5 index card with a number such as the number three written and/or brailled on it into the upper beveled opening between the abbreviated horizontally extending barrier 120 and white board 200 (friction between the abbreviated horizontally extending barrier 120 and white board 200 will hold it in place). Next insert the card with a number such as the number one written and/or brailled on it into the lower beveled opening between the abbreviated horizontally extending barrier 120 and white board 200 (as before, friction will hold it in place). More specifically, the bottom edge of the numerator card will slide behind the upper beveled friction edge surface 140 of the abbreviated horizontally extending barrier 120, and the top edge of the denominator cards will slide behind the lower beveled friction edge surface 141 of the abbreviated horizontally extending barrier 120. As a result, a fractional representation of the whole number three, i.e. three over one has been constructed. The three is in the numerator position and the one is in the denominator position.

Two numbers are reciprocals if and only if their product is 1. This means that a reciprocal is a number that the user multiplies by so that the result equals 1. Another way to say it is that a number and its reciprocal are inversely related.

In this example, what is the reciprocal of three?

The easiest way to determine a reciprocal is to just flip the fraction over. Physically take the two cards and swap their positions. The user should now have the index card with the number one written and/or brailled on it in the numerator and the index card with the number three written and/or brailled on it in the denominator for a fraction of one over three, or one third. Three is the same as three over one; therefore its reciprocal is one over three.

Numerical Order and Quantity Processing Example

Construct a horizontal line on the magnetic white board 200 by affixing six abbreviated horizontally extending barriers 120 along a horizontal axis on the white board at a comfortable height for the user. This is done by placing the rear beveled face 132 of each abbreviated horizontally extending barrier 120 against the white board 200 for allowing the disk shaped magnets 156, 158 in each barrier 120 to magnetically couple to the white board 200. Additionally, attach one end of one barrier 120 to one end of another barrier consecutively by repeatedly coupling one first cylindrically shaped magnet 152 to one second cylindrically shaped magnet 154. If the polarity of the attaching magnets is identical, rotate one or more of the abbreviated horizontally extending barriers 120 one-hundred-eighty degrees in order to align magnets of opposite polarity and connect the abbreviated horizontally extending barriers 120 to one another. The space above the constructed horizontal line will be used as the workspace.

The instructor prepares six 3×5 index cards that have been written and/or brailled on with, for example, the following fractional and decimal numbers: 0.20, ¼, ⅖, 0.50, ⅔, 0.80. The instructor will then firmly insert, in random order, each index card into the beveled opening between each abbreviated horizontally extending barrier 120 and white board (friction between the long horizontal and white board will hold it in place). Use one card per abbreviated horizontally extending barrier 120. The bottom edge of the index cards will slide behind the upper beveled friction edge surface 140 of each abbreviated horizontally extending barriers 120.

The student will examine the cards and place them in ascending order from left to right by physically rearranging them. The correct order should be: 0.20, ¼, ⅖, 0.50, ⅔, 0.80.

Depending on the quantity of numbers the student is required to compare, the horizontal work area can be expanded simply by connecting additional abbreviated horizontally extending barriers 120 along the horizontal axis.

It should be noted that if the instructor desires, three horizontally extending barriers 20 can be used in place of, or in addition to, the six abbreviated horizontally extending barriers 120 used above. The horizontally extending barriers 120 affix to the white board and attach to one another in the same manner as described above.

The above delineation of the system 10 for conceptualizing spatial concepts, including its use and operation; demonstrate the industrial applicability of this invention.

Moreover, having thus described the present invention, it should be apparent that numerous modifications and adaptations may be resorted to without departing from the scope and fair meaning of the present invention as set forth hereinabove and as described hereinbelow by the claims.

We claim:

1. A system for conceptualizing spatial concepts, said system comprising:
a first member having an elongated body, said elongated body having a front face and a rear beveled face, said rear beveled face comprised of a rectangularly shaped planar face, a first beveled friction surface extending along a first longitudinal edge of said rectangularly shaped planar face, and a second beveled friction surface spaced from said first beveled friction surface and extending along a second longitudinal edge of said rectangularly shaped planar face wherein said first and second beveled friction surfaces are angled away from said rear beveled face toward said front face of said elongated body at an acute angle;

at least one first magnet embedded within said elongated body of said first member for magnetically coupling said first member to a magnetic working surface when said rectangularly shaped planar face is abutted against the magnetic working surface; and wherein said first beveled friction surface frictionally engages a substantially flat planar edge of a first medium received between said first beveled friction surface and the magnetic working surface for frictionally securing the first medium to the magnetic working surface and wherein said second beveled friction surface frictionally engages a substantially flat planar edge of a second medium received between said second beveled friction surface and the magnetic working surface for frictionally securing the second medium to the magnetic working surface for use in aiding students in a conceptualization of spatial concepts of the received mediums.

2. The system of claim 1 further comprising a second magnet embedded within said elongated body to attract an adjacent south pole face of a third magnet external to said elongated body to a first end of said elongated body and a fourth magnet embedded within said elongated body to attract an adjacent north pole face of a fifth magnet external to said elongated body to a second end of said elongated body.

3. The system of claim 2 further comprising a second member having an elongated body, said elongated body of said second member having a front face and a planar rear face; and at least one magnet embedded within said elongated body of said second member for magnetically coupling said second member to the magnetic working surface when said rectangularly shaped planar face of said elongated body of said second member is abutted against the magnetic working surface.

4. The system of claim 3 wherein said third magnet is embedded within said elongated body of said second member at a location for a medial portion of a first side face of said elongated body of said second member to magnetically couple with said first end of said elongated body of said first member in a substantially perpendicular relationship when said first end of said elongated body of said first member and said medial portion of said first side face of said elongated body of said second member are abutted together.

5. The system of claim 3 wherein said fifth magnet is embedded within said elongated body of said second member at a location for a medial portion of a second side face of said elongated body of said second member to magnetically couple with said second end of said elongated body of said first member in a substantially perpendicular relationship when said second end of said elongated body of said first member and said medial portion of said second side face of said elongated body of said second member are abutted together.

6. The system of claim 1 wherein the first medium and the second medium are both Brailled index cards.

7. A system for conceptualizing spatial concepts, said system comprising:

a plurality of horizontally extending tactile feedback members;

means for magnetically coupling each of said plurality of horizontally extending tactile feedback members to a magnetic working surface;

at least one vertically extending tactile feedback member;

means for magnetically coupling at least said one vertically extending tactile feedback member to the magnetic working surface at a location that is interposed between two of said plurality of horizontally extending tactile feedback members that are consecutively coupled to the magnetic working surface for defining horizontally and vertically partitioned work areas; and wherein each of said plurality of horizontally extending tactile feedback members is comprised of means for receiving a portion of at least one medium for locating a remaining portion of at least the one medium in one of said horizontally or vertically partitioned work areas for conveying spatial concepts to students for aiding the students in the conceptualization of these spatial concepts.

8. The system of claim 7 wherein the students are blind.

9. The system of claim 7 wherein the students are visually impaired.

10. The system of claim 7 wherein the students are kinesthetic learners.

11. The system of claim 7 wherein at least the one medium is comprised of a brailled index card for providing tactile feedback of information.

12. The system of claim 7 wherein at least the one medium is comprised of an index card having written information.

13. The system of claim 7 wherein at least the one medium is comprised of an index card having information in both writing and brail.

14. The system of claim 7 wherein said means for receiving a portion of at least one tactile medium for locating a remaining portion of at least the one tactile medium in one of said horizontally or vertically partitioned work areas is comprised of a rear beveled face having a rectangularly shaped planar face, a first beveled friction surface extending along a first longitudinal edge of said rectangularly shaped planar face, and a second beveled friction surface spaced from said first beveled friction surface and extending along a second longitudinal edge of said rectangularly shaped planar face wherein said first and second beveled friction surfaces are angled away from said rear beveled face at an acute angle.

* * * * *